(12) United States Patent
Guarnieri (10) Patent No.: US 8,340,409 B2
(45) Date of Patent: Dec. 25, 2012

(54) SYSTEMS AND METHODS FOR OUTLINING IMAGE DIFFERENCES

(75) Inventor: Stuart Guarnieri, Laramie, WY (US)

(73) Assignee: Konica Minolta Laboratory U.S.A., Inc., San Mateo, CA (US)

(*) Notice: Subject to any disclaimer, the term of this patent is extended or adjusted under 35 U.S.C. 154(b) by 885 days.

(21) Appl. No.: 12/416,119

(22) Filed: Mar. 31, 2009

(65) Prior Publication Data

US 2010/0246979 A1 Sep. 30, 2010

(51) Int. Cl.
*G06K 9/00* (2006.01)
(52) U.S. Cl. ......................... 382/162; 382/209; 382/219
(58) Field of Classification Search .................. 382/100, 382/162, 209, 218, 219, 220, 221
See application file for complete search history.

(56) References Cited

U.S. PATENT DOCUMENTS

| | | | | |
|---|---|---|---|---|
| 6,026,183 A | * | 2/2000 | Talluri et al. | 382/194 |
| 6,061,476 A | * | 5/2000 | Nichani | 382/270 |
| 6,961,468 B2 | | 11/2005 | Huang et al. | |
| 7,076,101 B2 | | 7/2006 | Chung et al. | |
| 7,092,571 B2 | | 8/2006 | Hsieh | |
| 7,092,572 B2 | | 8/2006 | Huang et al. | |
| 8,019,588 B1 | * | 9/2011 | Wohlberg et al. | 703/22 |
| 2002/0099295 A1 | * | 7/2002 | Gil et al. | 600/476 |
| 2004/0086156 A1 | * | 5/2004 | Furukawa et al. | 382/112 |
| 2010/0246948 A1 | | 9/2010 | Guarnieri | |

OTHER PUBLICATIONS

Office Action dated Apr. 3, 2012, in related U.S. Appl. No. 12/416,119, filed Mar. 31, 2009, Kiyoshi Miyake.

* cited by examiner

*Primary Examiner* — John Strege
(74) *Attorney, Agent, or Firm* — Finnegan, Henderson, Farabow, Garrett & Dunner, L.L.P.

(57) ABSTRACT

Methods disclosed permit the outlining of difference images associated with an image pair. In some embodiments, an outlined difference image may be generated by selecting at least one non-zero pixel in a thresholded difference image and setting the value of the selected pixel to the maximum value permitted for that color space. In some embodiments, each color component of the selected pixel may be set to the maximum value permitted for that color component. The outlined difference image may also be scaled while preserving thresholded difference information. In some embodiments, the outlined difference image may be rendered using a monitor or a printer.

17 Claims, 7 Drawing Sheets

SYSTEMS AND METHODS FOR OUTLINING IMAGE DIFFERENCES

CROSS REFERENCES TO RELATED APPLICATIONS

This application is related to the application entitled "SYSTEMS AND METHODS FOR ENHANCING IMAGE DIFFERENCES," Ser. No. 12/416,100 filed concurrently herewith. The above-mentioned application is hereby incorporated by reference into this application in its entirety for all purposes.

BACKGROUND

1. Field of the Invention

The present invention relates to the field of image and graphics processing and printing and in particular, to systems and methods for outlining differences between high resolution images.

2. Description of Related Art

When digital high resolution images are used, the images are often compared to determine differences between the images. The comparing of images may arise in the context of both graphics and image processing applications. For example, in image processing, when multiple image processing algorithms are used to process the same input image, comparing the output images may be useful in determining differences in the output images produced by the various algorithms. As another example, when a printer is being tested with various rendering intent or color mapping algorithms it may be useful to compare the bit mapped output images produced by the algorithms against "gold standard" images or the images produced by another printer as they exist in frame buffer memory of the printer.

One approach to comparing the images is to print the images on a high resolution printer or display the images on a high resolution monitor in order to identify differences by visually inspecting the images. However, such an approach, besides being time consuming, is unlikely to yield consistent results. Moreover, even the most detailed visual inspection will fail to catch minor image differences, or image differences that may be masked because of the nature of the images.

Another approach is to calculate the difference in digital images by comparing corresponding pixels in the two images on a pixel-by-pixel basis and produce an output difference image based on the pixel differences between the images being compared. However, in such an approach, large numbers of inconsequential differences between pixel values may appear in the difference image making it difficult to focus on differences between the two images that a user may deem important. Therefore, there is a need for systems and methods to permit the outlining of image differences between images in a flexible manner that permits quick and easy identification of image differences.

SUMMARY

Consistent with embodiments presented, a method for determining differences between images is presented. In some embodiments, a method for outlining image differences in an input difference image specified in a color space comprises the steps of: selecting at least one target pixel in the input difference image, wherein a value associated with the selected target pixel exceeds a threshold value; and generating an outlined difference image by setting the value associated with the at least one selected target pixel to a maximum value permitted by the color space.

Embodiments also relate to software, firmware, and program instructions created, stored, accessed, or modified by processors using computer-readable media or computer-readable memory. The methods described may be performed on a computer and/or a printing device. These and other embodiments are further explained below with respect to the following figures.

DETAILED DESCRIPTION

In accordance with embodiments reflecting various features of the present invention, systems and methods for outlining image differences between digital images are presented.

Figure 1:
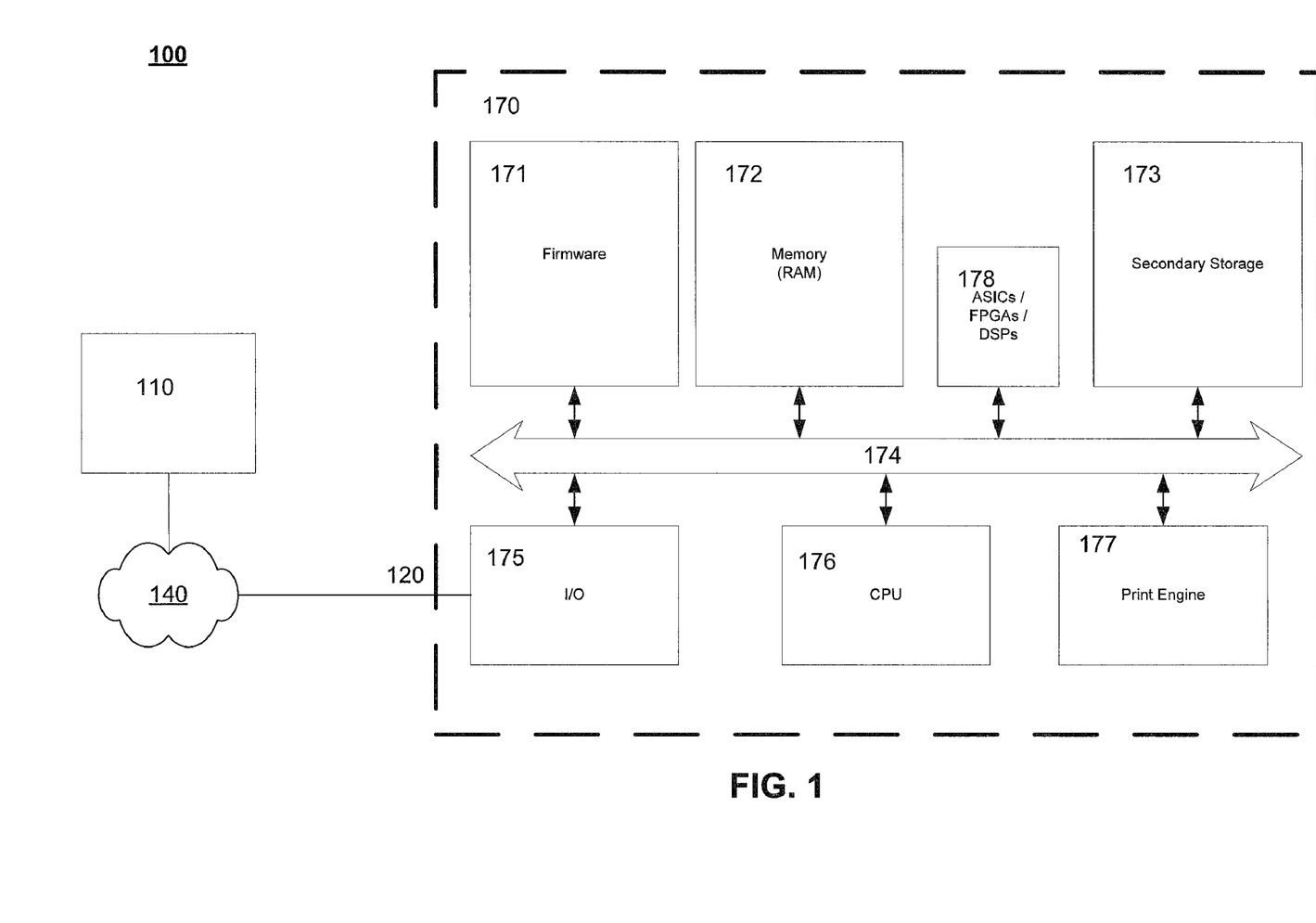
FIG. 1 shows a high level block diagram of a computer coupled to an exemplary printer.

FIG. 1 shows a block diagram illustrating an exemplary computer 110 coupled to exemplary printer 170 using connection 120, which may pass through network 140. In general, an application for outlining image differences between digital images may be deployed on a network of computers and printing devices that may communicate over network 140. As shown in FIG. 1, exemplary system 100 includes computer 110, which may be a computer workstation, desktop computer, laptop computer, or any other appropriate computing device.

Connection 120 couples computing device 110 and printer 170 and may be implemented as a wired or wireless connection using conventional communication protocols and/or data port interfaces. In general, connection 120 can be any communication channel that allows transmission of data between the devices. In one embodiment, for example, the devices may be provided with conventional data ports, such as parallel ports, serial ports, Ethernet, USB™, SCSI, FIREWIRE™, and/or coaxial cable ports for transmission of data through the appropriate connection. Network 140 could include a Local Area Network (LAN), a Wide Area Network (WAN), or the Internet.

Printer 170 may be any device that can be configured to produce physical documents from electronic data including, but not limited to, electro-photographic printers, such as laser printers and LED printers, ink-jet printers, thermal printers, laser imagers, and offset printers. Printer 170 may have an image transmitting/receiving function, an image scanning function, and/or a copying function, as installed in facsimile machines and digital copiers. Exemplary printer 170 may also be capable of directly printing documents received from computing device 110 with (or without) additional processing by computing device 110.

Computing device 110 may contain a removable media drive, which may include, for example, 3.5 inch floppy drives, CD-ROM drives, DVD ROM drives, CD±RW or DVD±RW drives, USB™ flash drives, drives for Memory Sticks™, Secure Digital High Capacity ("SDHC") cards, and/or any other computer-readable removable media drives. Portions of applications may reside on removable media and be read by computing device 110 prior to being acted upon by system 100. Document processing and image processing software running on computing device 110 may allow users to view, edit, process, and store documents and images conveniently. Computer 110 may also execute applications compare and outline differences between digital images, perform image scaling operations, and render the outlined difference image on a monitor coupled to computer 100.

Exemplary printer 170 may contain bus 174 that couples a Central Processing Unit ("CPU") 176, firmware 171, memory 172, input-output ports 175, print engine 177, and secondary storage device 173. Exemplary Printer 170 may also contain other processing elements, such as Application Specific Integrated Circuits (ASICs), Digital Signal Processors (DSPs), and/or Field Programmable Gate Arrays (FPGAs) 178 that are capable of executing portions of an application to compare and outline differences between digital images, scale images, and to print images and other documents. Printer 170 may also be capable of printing an output image that outlines differences between the images being compared in a manner consistent with disclosed embodiments.

Exemplary printer 170 may also be able to access secondary storage or other memory in computing device 110 using I/O ports 175, network 140, and connection 120. In some embodiments, printer 170 may also be capable of executing software including a printer operating system and other appropriate application software. Exemplary printer 170 may allow paper sizes, output trays, color selections, parameters for image differencing algorithms, print resolution, among other options, to be user-configurable.

Exemplary CPU 176 may be a general-purpose processor, a special purpose processor, or an embedded processor. CPU 176 can exchange data including control information and instructions with memory 172 and/or firmware 171. Memory 172 may be any type of Dynamic Random Access Memory ("DRAM") such as but not limited to SDRAM, or RDRAM. Firmware 171 may hold instructions and data including but not limited to a boot-up sequence, pre-defined routines including routines for image processing, document processing, routines to compare and outline differences between digital images, image scaling routines, and other code. In some embodiments, code and data in firmware 171 may be copied to memory 172 prior to being acted upon by CPU 176.

In some embodiments, firmware 171 may also include rasterization routines to convert display commands in a display list to an appropriate rasterized bit map image and store the bit mapped image in memory 172. Firmware 171 may also include routines for image compression, decompression, and memory management routines. Data and instructions in firmware 171 may be upgradeable using one or more of computer 110, network 140, and/or secondary storage 173.

Exemplary CPU 176 may act upon instructions and data and provide control and data to ASICs/FPGAs 178 and print engine 177 to generate printed output by rendering the outlined difference image by processing differences between compared images in a manner consistent with disclosed embodiments. ASICs/FPGAs 178 may also provide control and data to print engine 177. FPGAs/ASICs 178 may also implement one or more of translation, compression, decompression, image comparison, image difference outlining, image scaling, and rasterization algorithms.

Exemplary secondary storage 173 may be an internal or external hard disk, Memory Stick™, SDHC card, or any other memory storage device or removable media device capable of being used by system 100. In some embodiments, the images being compared and/or the outlined difference image may reside and be transferred between one or more of printer 170 and computing device 110 depending on where the document processing occurs. Memory to store the images being compared and/or the outlined difference image may be a dedicated memory, and/or form part of general purpose memory 172, or some combination thereof. In some embodiments, digital images being compared and/or an outlined digital difference image may be stored on removable media coupled to computer 110, or on secondary storage 173 coupled to printer 170. Portions of the stored image(s) may be loaded into main memory on computer 110, and/or memory 172 in printer 170 during processing.

Figure 2A:
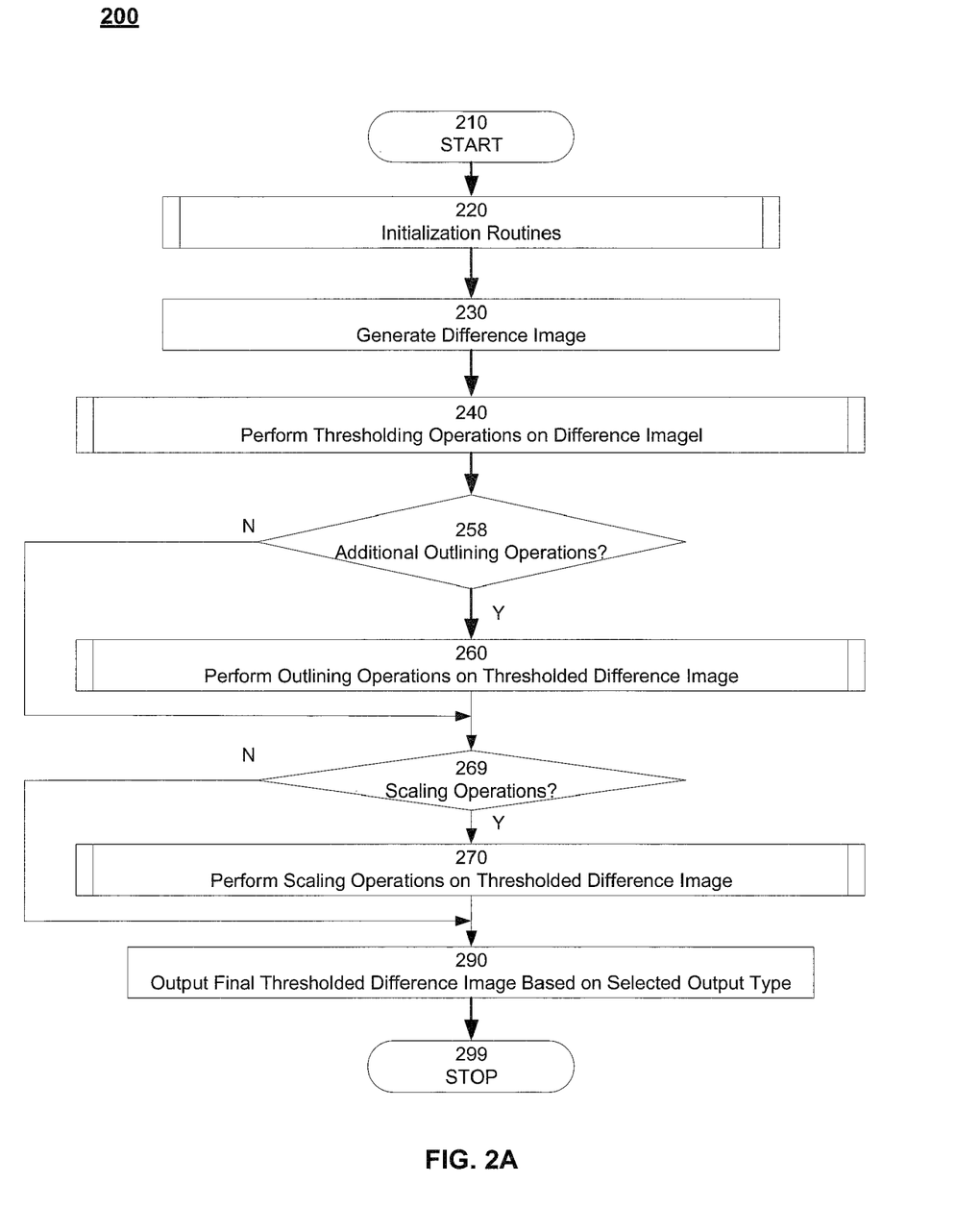
FIG. 2A shows a flowchart illustrating steps in an exemplary method for outlining image differences in a manner consistent with disclosed embodiments.

FIG. 2A shows a flowchart illustrating steps in an exemplary method 200 for outlining image differences in a manner consistent with disclosed embodiments. The algorithm may commence in step 210, and initialization routines may be invoked in step 220. In some embodiments, initialization routines may include setting up and initializing variables, selecting and configuring a paintbrush, allocating memory, and various other program related operations.

If the input to exemplary method 200 is a pair of images, then initialization routines may generate a difference image using the image pair. Accordingly, initialization routine may involve one or more of resizing one or both of the images in the image pair so that their dimensions are identical, color space converting one the images to the color space of the other image, and/or rasterizing the images to bitmapped form. For example, an image in the CMYK color space CMYK color space comprising of Cyan ("C"), Magenta ("M"), Yellow ("Y"), and Black ("K") color components (or color planes) may be converted to an image in the RGB color space, which comprises of the Red, Green, and Blue color components, if the second image is specified in the RGB space. An image in a color space with a larger gamut of representable colors may be converted to a color space with a smaller gamut of representable colors, or vice versa. One of the images in the image pair may be scaled so that the image sizes are identical. For example, the image with smaller dimensions than a larger one may be scaled to match the size of the larger image.

In step 230, once the input image pair have been represented in the same color space and have identical dimensions then a difference image may be generated by subtracting a value associated with a pixel in the first image from the value associated with a corresponding pixel in the second image. For a pair of images $I_1$ and $I_2$ of size M×N in the same color space, a difference image D may be calculated as $D(x, y, p)=\text{Absolute\_Value}(I_1(x, y, p)-I_2(x, y, p))$, where Absolute_Value( ) represents the absolute value or magnitude function, x and y are positional coordinates of a pixel in the image and $1 \leq x \leq M$, and $1 \leq y \leq N$, in color plane p. $D(x, y, p)$, $I_1(x, y, p)$, and $I_2(x, y, p)$ are values associated with pixel (x, y) in images D, $I_1$, and $I_2$, respectively. In some embodiments, for an image in a color space with multiple components, a multi-component difference image may be generated, one component difference image for each color component associated with the input images.

In general, a difference image can result from subtracting values associated with corresponding pixels in two images with identical dimensions in the same color space. In some embodiments, the difference image may consist of difference components corresponding to color components of the color space. Each difference component can the indicate differences between the images (in the image pair) for a color component. For example, a difference image in the CMYK color space may comprise four difference components, one difference component for each of the C, M, Y, and K planes.

Next, exemplary predefined routine 240 may be invoked to perform thresholding operations to outline differences using the difference image. In some embodiments, thresholding may be performed to outline differences on a pixel-by-pixel basis for the entire difference image based on a user or system specified threshold. Thresholding operations performed by exemplary pre-defined routine 240 are described further in relation to FIG. 2B later in this document.

In step 258, the user may be asked whether additional operations to further outline image differences are to be performed. If additional outlining operations are to be performed ("Y" in step 258) then predefined routine 260 may be invoked to perform additional outlining operations. Additional outlining operations performed by exemplary pre-defined routine 260 are described further in relation to FIG. 2C later in this document. If no additional outlining operations are to be performed ("N" in step 258) then the algorithm proceeds to step 269.

In step 269, the user may be asked whether image scaling operations are to be performed to further outline image differences. If image scaling operations are to be performed ("Y" in step 269) then predefined routine 270 may be invoked to perform the scaling operations. Scaling operations performed by exemplary pre-defined routine 260 are described further in relation to FIG. 2D later in this document. If no additional scaling operations are to be performed ("N" in step 269) then the algorithm proceeds to step 290.

In step 290, the outlined difference image may be output. Depending on the operations selected, various types of difference images may be rendered to outline image differences. In some embodiments, one component thresholded difference image may be output for each color component in the difference image. In some embodiments, a single thresholded difference image may be output that combines the information from each component thresholded difference image. In some embodiments, the information from each component thresholded difference image may be combined to produce an output in black and white (i.e. as a single plane thresholded difference image with 2 states per pixel. The algorithm may then terminate in step 299.

Figure 2B:
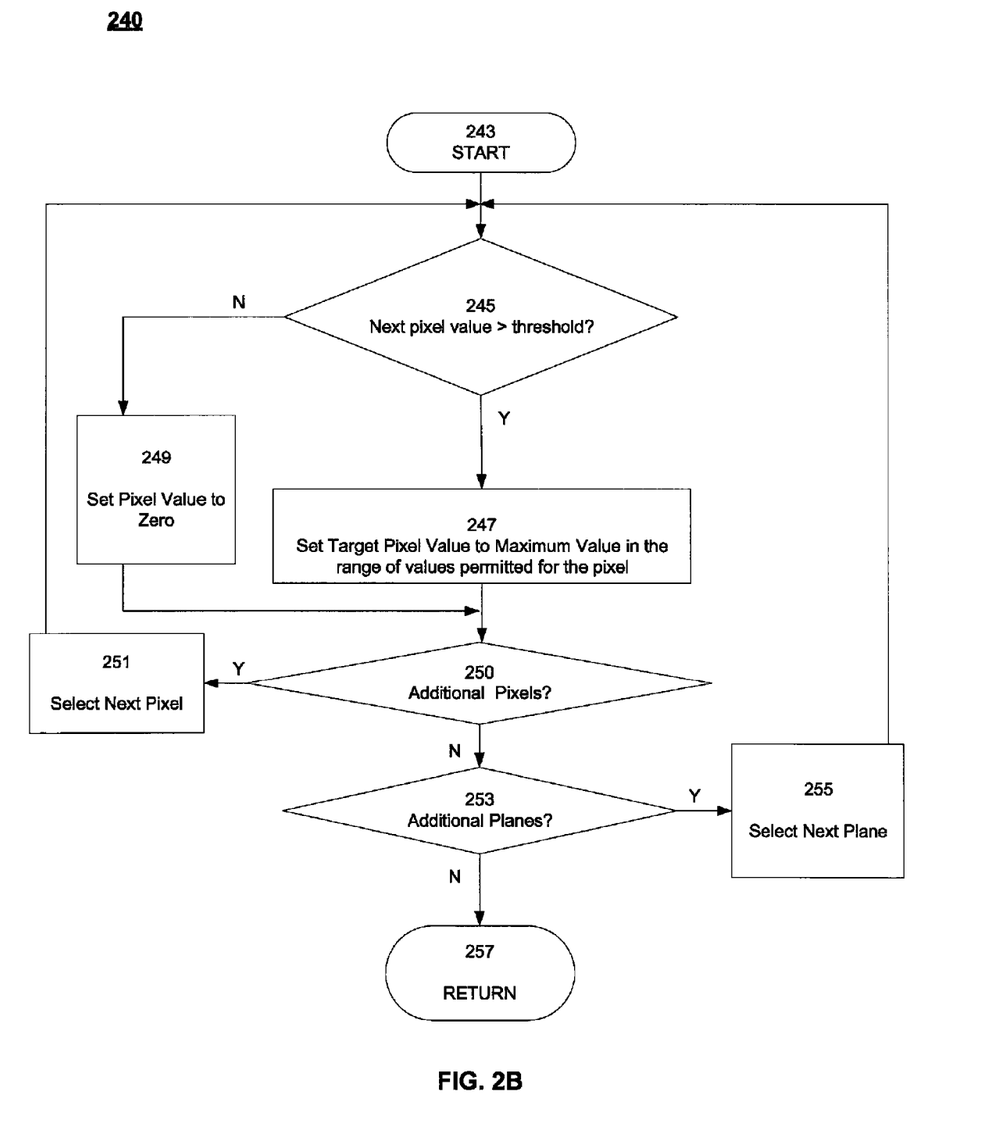
FIG. 2B shows a flowchart illustrating steps performed by an exemplary predefined routine to outline image differences using thresholding.

FIG. 2B shows a flowchart illustrating steps in an exemplary predefined routine 240 to outline image differences using thresholding. The algorithm implemented by exemplary predefined routine 240 commences in step 243. In step 245, the algorithm checks whether the first or next value associated with the pixel is greater than some user-specified, system specified, or default threshold. Note that the pixels considered by predefined routine 240 are those with a non-zero value in the difference image for a color component. In some embodiments, pixels associated with zero values are ignored and not considered for selection as target pixels.

If the value associated with the pixel (or pixel value) is not greater than the threshold ("N" in step 245), then the algorithm proceeds to step 249, where the pixel value may be set to zero, before proceeding to step 250. If the pixel value is greater than the threshold ("Y" in step 245), then, in step 247, the pixel is selected as an outlining target. In step 247, the target pixel value may be set to the maximum value in the range of values permitted for pixels in that color space.

In step 250, the algorithm checks if there are additional target pixels to be processed. If there are additional pixels to be processed ("Y" in step 250), then, in step 251, the next pixel may be selected and the algorithm returns to step 245 to begin another iteration. If there are no additional pixels to be processed ("N" in step 250), then, in step 253, the algorithm checks whether there additional color components or color planes associated with the difference image to be processed.

If there are additional color planes to be processed ("Y" in step 253), then, in step 255, the next color plane may be selected and the algorithm returns to step 245 to begin another iteration. If there are no additional color planes to be processed ("N" in step 250), then, control is returned to the calling program in step 257.

In some embodiments, predefined routine 240 may operate on input difference image D to create a thresholded difference image T, where pixel values that do not exceed some threshold are set to zero, while pixel values that are above the threshold are set to the maximum pixel value permitted by the color space. For example, in an RGB color space with 8-bits per component pixel, component pixel values that exceed the threshold may be set to 255 (corresponding to the hexadecimal value 0xFF). Thresholded difference image T serves to outline pixel differences between images $I_1$ and $I_2$.

Figure 2C:
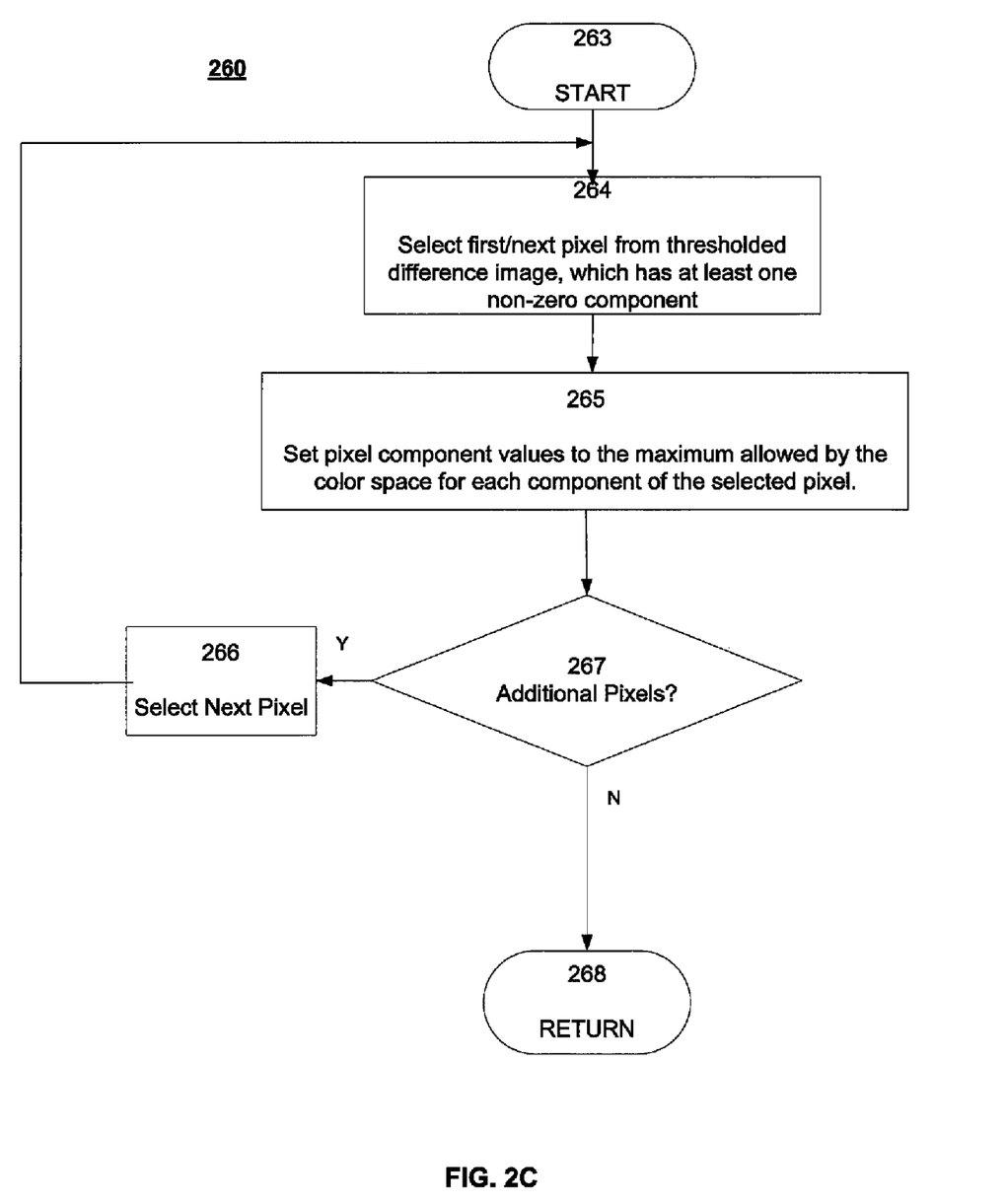
FIG. 2C shows a flowchart illustrating steps in an exemplary method to outline image differences using thresholding in a multi-plane color image.

FIG. 2C shows a flowchart illustrating steps in an exemplary method to outline image differences using thresholding in a multi-plane color image. In some embodiments, predefined routine 260 may be invoked to perform additional outlining operations on thresholded image T. The algorithm implemented by exemplary predefined routine 260 commences in step 263. In step 264, the first or next pixel with at least one non-zero component in thresholded difference image T may be selected. In step 265, the component values associated with the selected pixel are set to the maximum value allowed by the color space for each component of the selected pixel. For example, in an RGB color space with 8-bits per component pixel, a selected pixel may have R set to 255. In step 265, the values for the G and B components of the selected pixel may each be set to 255 (hexadecimal 0xFF). In mathematical terms the pixel value for the selected pixel at the end of step 265 may be expressed as (R, G, B)=(255, 255, 255).

In step 267, the algorithm checks if there are additional pixels to be processed in thresholded difference image T. If there are additional target pixels to be processed ("Y" in step 267), then, in step 266, the next pixel may be selected and the algorithm returns to step 264 to begin another iteration. If there are no additional pixels to be processed ("N" in step 267), then, control is returned to the calling program in step 268.

Predefined routine 260 operates on input thresholded difference image T to create a maximal thresholded difference image $T_M$, where pixel values are either zero for all components, or the maximum allowed by the color space. Maximal thresholded difference image $T_M$ serves to further emphasize and outline pixel differences between images $I_1$ and $I_2$.

Figure 2D:
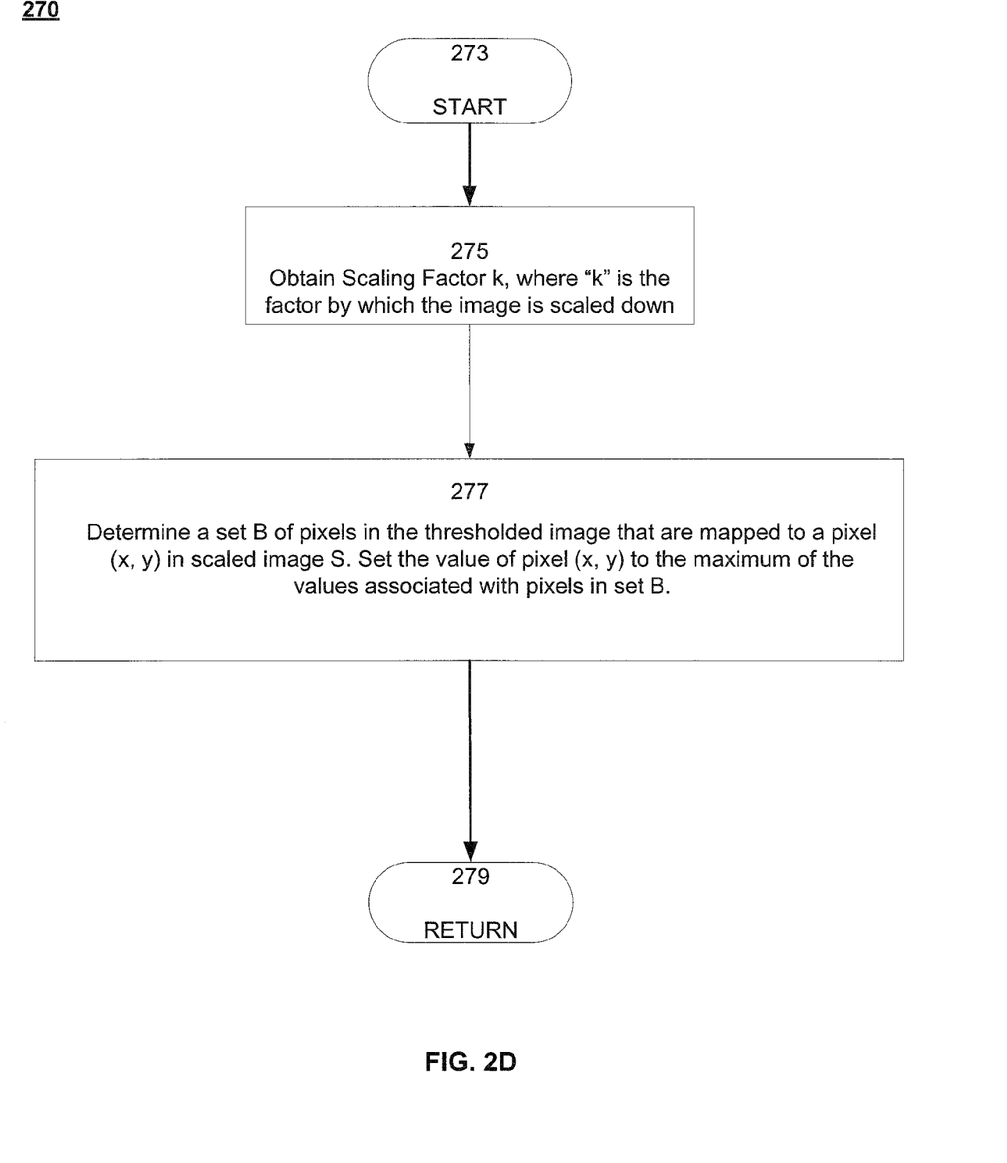
FIG. 2D shows a flowchart illustrating steps in an exemplary method to outline image differences using scaling operations.

FIG. 2D shows a flowchart illustrating steps in an exemplary method to outline image differences using scaling operations. In some embodiments, predefined routine 260 may be invoked to perform scaling operations on thresholded difference image T, or on the maximal thresholded difference image $T_M$. The algorithm implemented by exemplary predefined routine 270 commences in step 273. In step 275, the scaling factor "k" for the image may be obtained. Scaling factor "k" may be a reduction factor, and may specify a ratio to scale down each dimension of the thresholded difference image. For example, if k=2, each dimension of T or $T_M$ may be reduced by half. In the example above, a 10×10 thresholded difference image would become 5×5 image after scaling using k=2.

When thresholded difference image T (or on the maximal thresholded difference image $T_M$) is scaled down, a set B of pixels (comprising a region) in thresholded difference image T can be mapped to a single pixel (x, y) in scaled image S. In step 277, the value associated with a pixel (x, y) in color plane p in scaled image S, may be calculated as the maximum of the values associated with pixels in set B. Thus, a pixel in scaled image S can further emphasize outlined differences between images $I_1$ and $I_2$ in a region B by using a single pixel to indicate whether the regions differ. Scaling algorithms are well known and mappings between pixels in scaled images may be easily derived using one or more of these algorithms.

Figure 3:
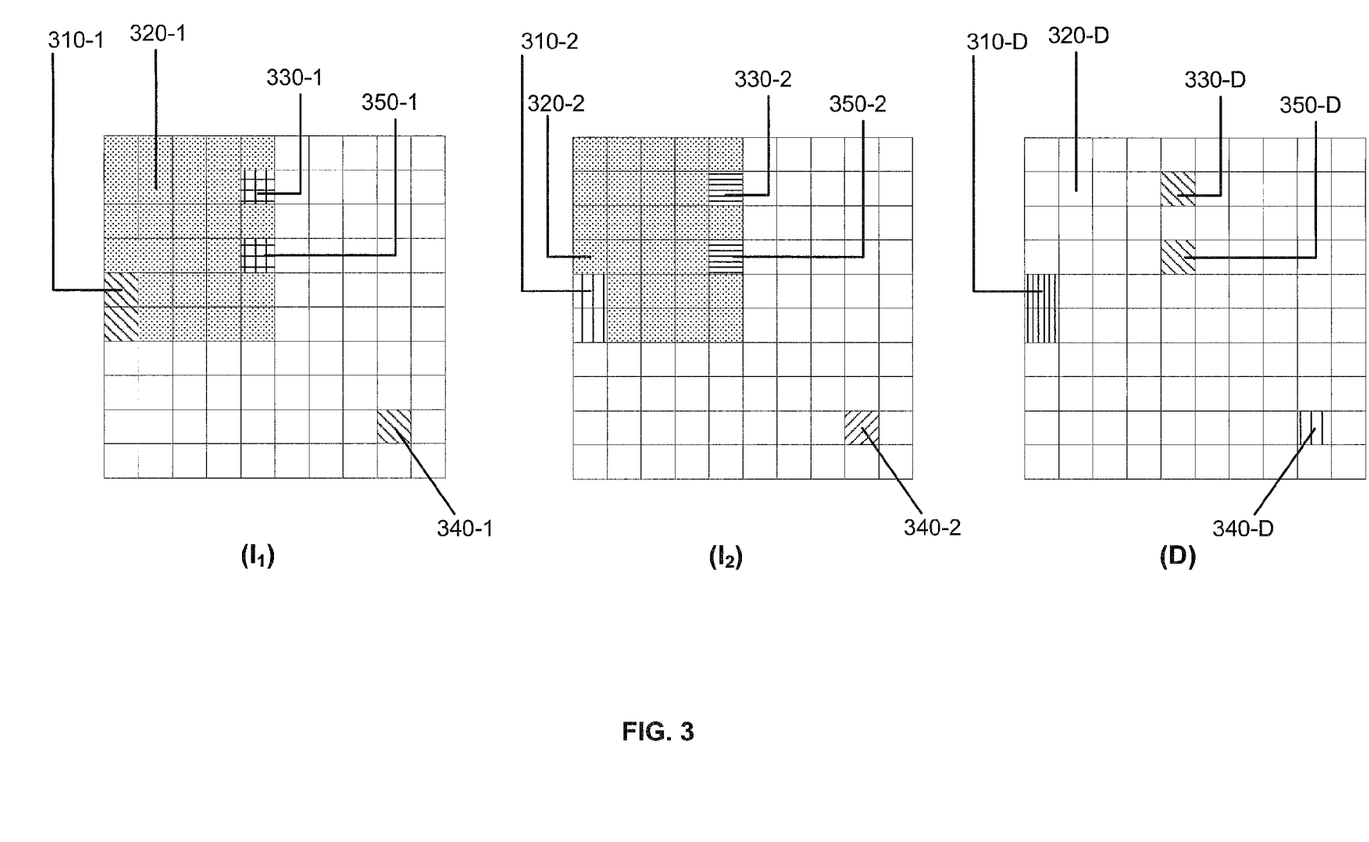
FIG. 3 shows the transformation of an exemplary image pair $I_1$ and $I_2$ into difference image D.

FIG. 3 shows the transformation of an exemplary image pair $I_1$ and $I_2$ into difference image D. As shown in FIG. 3, difference image D is obtained by subtracting pixel values of corresponding pixels in image $I_2$ from $I_1$. As shown in FIG. 3, corresponding pixels in areas 320-1 and 320-2 in images $I_1$ and $I_2$, respectively, have the same values. Therefore, the value associated with these pixels in region 320-D in difference image D is zero.

Further, the difference in values between corresponding pixels 310-1 and 310-2 in images $I_1$ and $I_2$, respectively, leads to some value in the corresponding pixel 310-D, as shown in FIG. 3. Similarly, corresponding pixel pairs 320-1 and 320-2, 340-1 and 340-2, 350-1 and 350-2 have different values (as indicated by the different shading patterns) and therefore pixels 320-D, 340-D, and 350-D in image D have values given by the difference of their respective pixel pairs. In some embodiments, difference image D may be input to predefined routine 240, where non-zero pixels in image D may be subject to thresholding.

Figure 4:
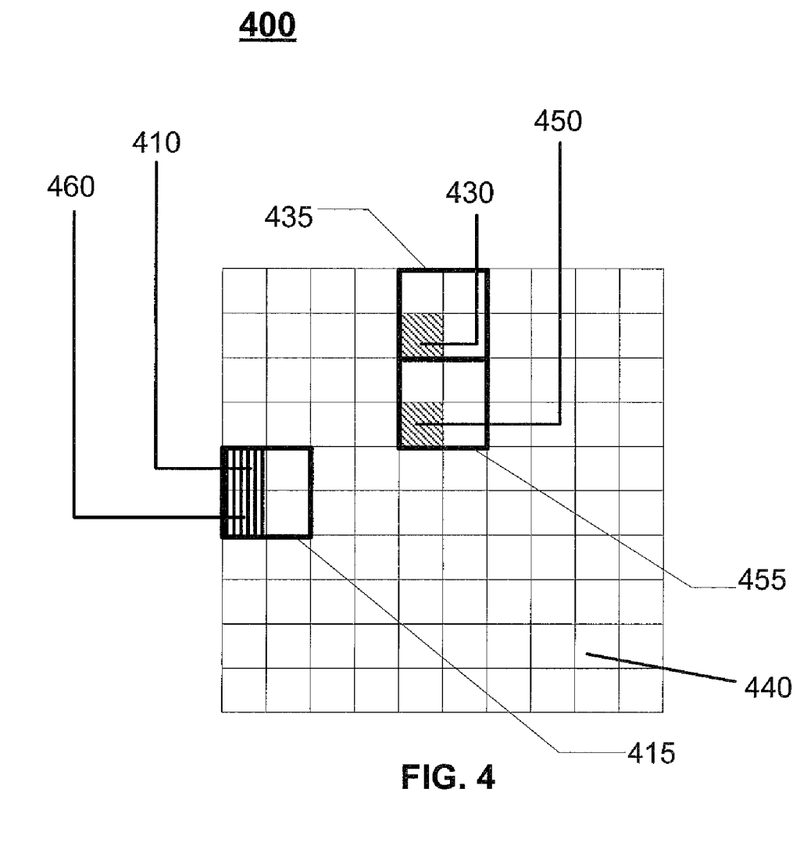
FIG. 4 illustrates a thresholded difference image 400 consistent with disclosed embodiments.

FIG. 4 illustrates a thresholded difference image 400 consistent with disclosed embodiments. As shown in FIG. 4, the values of pixels 410, 430, 450, and 460 exceed the value of the threshold. Therefore, pixel values for these pixels are set to the maximum value allowed for the color space. On the other hand, pixel value 440 does not exceed the value of the threshold; therefore the value of pixel 440 is set to 0.

Figure 5:
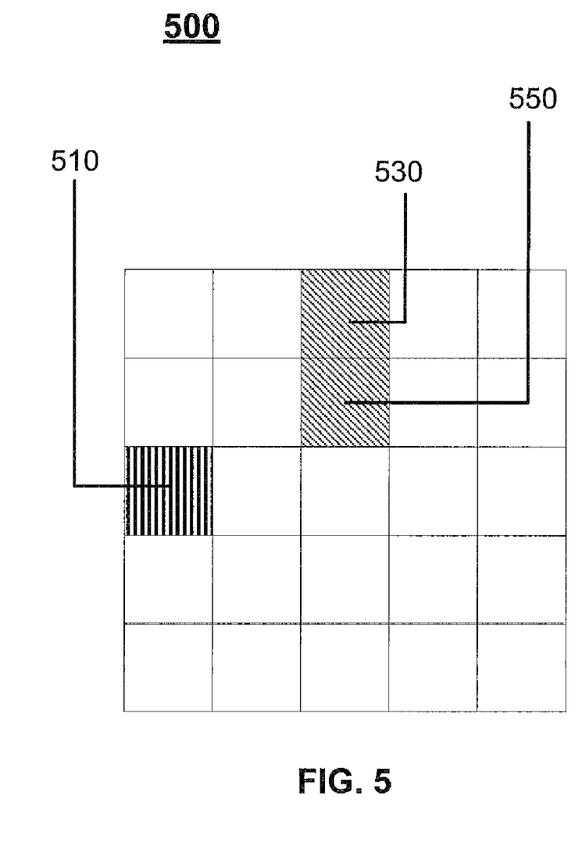
FIG. 5 illustrates the scaling of an exemplary thresholded difference image in a manner consistent with disclosed embodiments.

FIG. 5 illustrates the scaling of an exemplary thresholded difference image in a manner consistent with disclosed embodiments. As shown in FIG. 5, scaled image S, which is scaled using reduction factor k=2, comprises pixels 510, 530 and 550. Region 415 (indicated by the heavy bordered area) in thresholded image 400 maps to pixel 510 in scaled image 500, whereas regions 435 and 455 maps to pixels 530 and 550 in scaled image 500, respectively. As shown in FIG. 5, pixel 510 takes on the maximum of values associated with pixels in region 415, which are the values associated with pixels 410 and 460. Similarly, pixel 530 takes on the maximum of values associated with pixels in region 435, which is the value associated with pixel 430; and pixel 550 takes on the maximum of values associated with pixels in region 455, which is the value associated with pixel 450.

In some embodiments, the exemplary differencing, thresholding, and scaling operations described may be performed on an input images in the frame buffer of printer 170 and the outlined print image(s) may be printed by printer 350. In some embodiments, images to be compared may be sent by printer 170 to computer 110, which may generate input difference image 305 and operate on input difference image 305 to produce an outlined difference image and display the outlined difference on a monitor or other display device coupled to computer 110.

Other embodiments of the present invention will be apparent to those skilled in the art from consideration of the specification and practice of one or more embodiments of the invention disclosed herein. It is intended that the specification and examples be considered as exemplary only, with a true scope and spirit of the invention being indicated by the following claims.

What is claimed is:

1. A processor-implemented method for outlining image differences in an input difference image specified in a color space comprising a plurality of discrete color components, the method comprising the steps of:

selecting at least one pixel in the input difference image, wherein a value associated with at least one of a plurality of discrete color components associated with the selected pixel exceeds a threshold value; and generating an outlined difference image comprising a plurality of component outlined difference images, wherein each component outlined difference image is associated with a distinct discrete color component of the color space, by setting a value associated with at least one pixel of a component outlined difference image to a maximum value permitted for the distinct discrete color component of the color space.

2. The processor-implemented method of claim 1, further comprising:

scaling the outlined difference image by a reduction factor;

mapping a set of pixels in the outlined difference image to at least one pixel in the scaled image; and setting a value associated with the at least one pixel in the scaled image to the maximum of the values associated with pixels in the mapped pixel set.

3. The processor-implemented method of claim 1, wherein the input difference image in the color space is obtained by subtracting a value associated with a pixel in a first image from a value associated with a corresponding pixel in a second image, wherein the first and second images are of identical dimensions and are also specified in the color space.

4. The processor-implemented method of claim 3, wherein the input difference image comprises a plurality of component difference images, wherein each component difference image is associated with a distinct color component of the color space.

5. The processor-implemented method of claim 1, further comprising rendering the outlined difference image by rendering each component outlined difference image separately.

6. The processor-implemented method of claim 1, further comprising rendering the outlined difference image as a composite color image.

7. The processor-implemented method of claim 1, further comprising rendering the outlined difference image as a black and white image.

8. The processor-implemented method of claim 1, wherein the method is performed on at least one of:

a computer; or a printer.

9. A non-transitory computer-readable medium that stores instructions, which when executed by a processor perform steps in a method for outlining image differences in an input difference image specified in a color space comprising a plurality of discrete color components, the steps comprising:

selecting at least one pixel in the input difference image, wherein a value associated with at least one of a plurality of discrete color components associated with the selected pixel exceeds a threshold value; and generating an outlined difference image comprising a plurality of component outlined difference images, wherein each component outlined difference image is associated with a distinct discrete color component of the color space, by setting a value associated with at least one pixel of a component outlined difference image to a maximum value permitted for the distinct discrete color component of the color space.

10. The non-transitory computer-readable medium of claim 9, further comprising:
scaling the outlined difference image by a reduction factor;
mapping a set of pixels in the outlined difference image to at least one pixel in the scaled image; and
setting a value associated with the at least one pixel in the scaled image to the maximum of the values associated with pixels in the mapped pixel set.

11. The non-transitory computer-readable medium of claim 9, further comprising rendering the outlined difference image by rendering each component outlined difference image separately.

12. The non-transitory computer-readable medium of claim 9, further comprising rendering the outlined difference image as a composite color image.

13. The non-transitory computer-readable medium of claim 9, further comprising rendering the outlined difference image as a black and white image.

14. A computer-readable memory that stores instructions, which when executed by a processor perform steps in a method for outlining image differences in an input difference image specified in a color space comprising a plurality of discrete color components, the steps comprising:
selecting at least one pixel in the input difference image, wherein a value associated with at least one of a plurality of discrete color components associated with the selected pixel exceeds a threshold value; and
generating an outlined difference image comprising a plurality of component outlined difference images, wherein each component outlined difference image is associated with a distinct discrete color component of the color space, by setting a value associated with at least one pixel of a component outlined difference image to a maximum value permitted for the distinct discrete color component of the color space.

15. The computer-readable memory of claim 14 further comprising:
scaling the outlined difference image by a reduction factor;
mapping a set of pixels in the outlined difference image to at least one pixel in the scaled image; and
setting a value associated with the at least one pixel in the scaled image to the maximum of the values associated with pixels in the mapped pixel set.

16. A processor-implemented method for outlining image differences in an input difference image specified in a color space, the method comprising the steps of:
selecting at least one pixel in the input difference image, wherein a value associated with the selected pixel exceeds a threshold value;
generating an outlined difference image, by setting the value associated with the at least one selected pixel to a maximum value permitted by the color space;
scaling the outlined difference image by a reduction factor;
mapping a set of pixels in the outlined difference image to at least one pixel in the scaled image; and
setting a value associated with the at least one pixel in the scaled image to the maximum of the values associated with pixels in the mapped pixel set.

17. The processor-implemented method of claim 16, wherein setting the value associated with the at least one selected pixel to the maximum value permitted by the color space further comprises setting the value of each component of the selected pixel to the maximum value permitted for that component.

* * * * *